(12) United States Patent
Fehr et al.

(10) Patent No.: US 8,924,095 B2
(45) Date of Patent: Dec. 30, 2014

(54) AUTOMATED SYSTEM FOR ENHANCED BLADE CONTROL

(71) Applicant: Caterpillar, Inc., Peoria, IL (US)

(72) Inventors: Drew A. Fehr, Washington, IL (US); Paul R. Friend, Morton, IL (US); Winnie E. Wong, Marquette Heights, IL (US)

(73) Assignee: Caterpillar Inc., Peoria, IL (US)

( * ) Notice: Subject to any disclaimer, the term of this patent is extended or adjusted under 35 U.S.C. 154(b) by 154 days.

(21) Appl. No.: 13/661,777

(22) Filed: Oct. 26, 2012

(65) Prior Publication Data
US 2014/0121908 A1 May 1, 2014

(51) Int. Cl.
*G06F 19/00* (2011.01)
*E02F 3/84* (2006.01)
*E02F 9/20* (2006.01)

(52) U.S. Cl.
CPC *E02F 3/84* (2013.01); *E02F 9/2025* (2013.01)
USPC .......................................................... 701/50

(58) Field of Classification Search
CPC .............. E02F 3/84; E02F 9/20; E02F 9/2025
USPC .......................................................... 701/50
See application file for complete search history.

(56) References Cited

U.S. PATENT DOCUMENTS

| | | | |
|---|---|---|---|
| 5,860,480 A * | 1/1999 | Jayaraman et al. | 172/2 |
| 7,139,662 B2 | 11/2006 | Ericcson et al. | |
| 2009/0069987 A1 | 3/2009 | Omelchenko et al. | |
| 2012/0000681 A1 * | 1/2012 | Douglas | 172/1 |
| 2012/0059554 A1 | 3/2012 | Omelchenko et al. | |

FOREIGN PATENT DOCUMENTS

WO    WO 2011/107096 A1    9/2011

* cited by examiner

*Primary Examiner* — Mary Cheung
*Assistant Examiner* — Anne Mazzara
(74) *Attorney, Agent, or Firm* — Finnegan, Henderson, Farabow, Garrett & Dunner LLP

(57) ABSTRACT

A blade control system for a track-type machine is disclosed. The blade control system has a blade, an input device configured to control movement of the blade, an actuator in connection with the blade, a first sensor configured to determine a track-speed of the machine, and a control module in communication with the input device, the actuator, and the first sensor. The control module is configured to receive a blade positioning signal from the input device, remove a component of the blade positioning signal based on a the track-speed of the machine, and transmit a modified blade positioning signal to the actuator.

20 Claims, 4 Drawing Sheets

AUTOMATED SYSTEM FOR ENHANCED BLADE CONTROL

TECHNICAL FIELD

The present disclosure relates generally to an automated machine control system and, more particularly, to a system for automatically controlling unwanted blade movement during an excavation process.

BACKGROUND

Machines such as, for example, dozers, motor graders, and other types of heavy equipment are used to perform a variety of tasks. Some of these tasks require very precise and accurate control over operation of the grading blade of the machine. Such control may be difficult at lower machine speeds, particularly due to blade bounce caused by grouser impacts with the work surface. The resulting blade bounce often causes the machine to produce an uneven graded surface. Because of these factors, the completion of some tasks can be expensive, labor intensive, time consuming, and inefficient.

One method to provide control over a blade is described in U.S. Patent Application Publication No. US 2009/069987 A1 ("the '987 publication") filed by Omelchenko on Sep. 9, 2008. The '987 publication describes a system that estimates a blade height and slope angle based on signals received from a global navigation satellite system and an inertial measurement unit, both mounted on the blade. The inputs are used in connection with a control algorithm to control the blade.

Although the '987 publication describes a system for blade control, the disclosed system is not configured to remove periodic signal noise from a blade positioning signal, nor does it account for factors such as machine speed that may adversely affect the signal to the blade actuators. Furthermore, the '987 publication describes a system that controls the height and pitch of a machine blade using a combination of an inertial sensor and a global navigation system, and does not address any factors that may vary with time, such as operational speed, machine configuration, and/or grouser impact frequency.

The disclosed system is directed to overcoming one or more of the problems set forth above.

SUMMARY

In one aspect, the present disclosure is directed to a blade control system for a track-type machine, including a blade that moves, an input device configured to control movement of the blade, an actuator in connection with the blade, a first sensor configured to determine a track speed of the machine, and a control module in communication with the input device, the actuator, and the first sensor. The control module is configured to receive a blade positioning signal from the input device, remove a component of the blade positioning signal, and transmit a modified blade positioning signal to the actuator.

In yet another aspect, the present disclosure is directed to a computer-implemented method of controlling a blade in a track-type machine, including receiving, at a control module, a blade positioning signal from an input device, removing, via one or more processors, a component of the blade positioning signal based on a track-speed of the machine, and transmitting, via one or more processors, a modified blade positioning signal to an actuator in connection with the control module.

DETAILED DESCRIPTION

Figure 1:
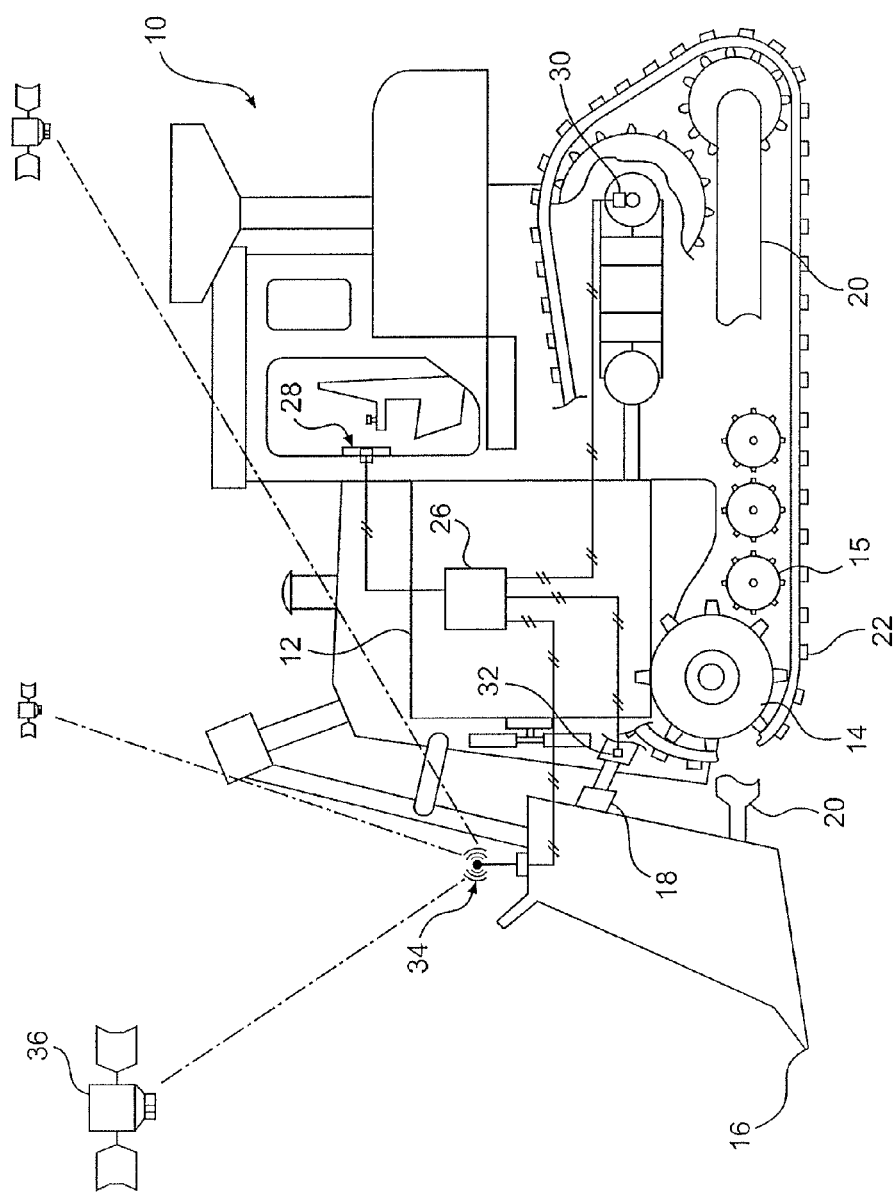
FIG. 1 is a pictorial illustration of an exemplary disclosed machine with a control system for use with the machine.

FIG. 1 illustrates an exemplary machine 10. Machine 10 may be a machine that performs some type of operation associated with an industry such as mining, construction, farming, or any other industry known in the art. For example, an operation may include a grading operation, a leveling operation, a bulk material removal operation, or some other type of operation that may utilize a track-type machine with a blade for moving material. Machine 10 may be a material handler, a backhoe, a dozer, a loader, or any other machine known in the art.

Machine 10 includes a power source 12. Power source 12 may include an engine such as, for example, a diesel engine, a gasoline engine, a gaseous fuel powered engine such as a natural gas engine, or any other type of engine apparent to one skilled in the art. Power source 12 may alternatively include a non-combustion source of power such as a fuel cell, a power storage device, an electric motor, or other similar mechanism. Machine 10 may further include a front idler 14 and front roller 15, both used in track movement of machine 10. Machine 10 may also include blade 16, shown as an exemplary work tool used in material handling. Blade 16 is movable by actuator 18 in connection with lever arm 20. Actuator 18 may be any suitable mechanical or electrical actuating device, such as, for example, a pneumatic pumping device, hydraulic device, a motor, etc. Machine 10 is embodied as a track-type machine, which includes a track containing a series of grousers 22. Grousers 22 are typically used to provide traction to machine 10 by contacting and engaging the ground or other work surface during machine operation. The movement and positioning of blade 16 is controlled using a blade control system 24 as described in FIG. 2.

Figure 2:
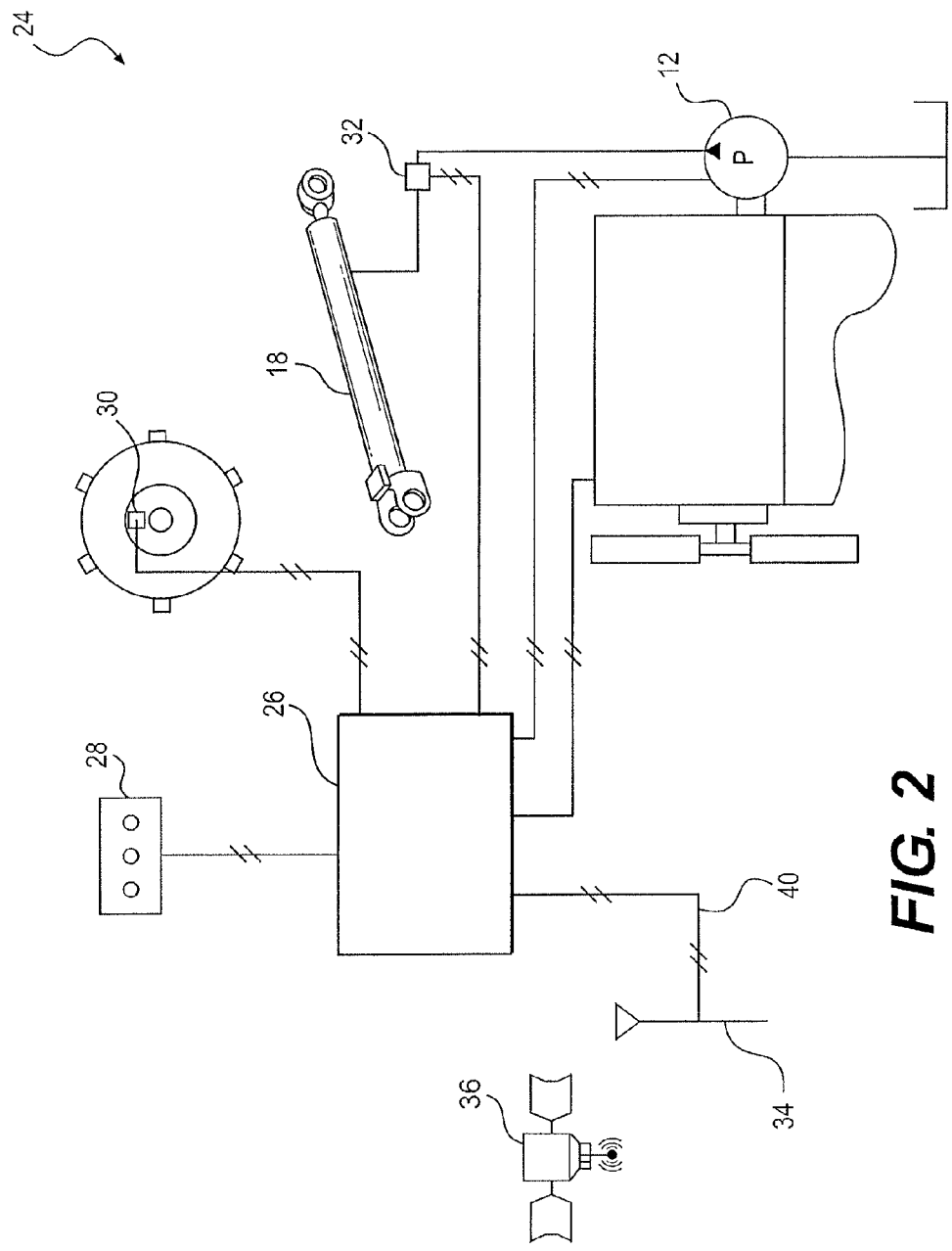
FIG. 2 is a diagrammatic illustration of an exemplary blade control system that may be used in conjunction with the machine of FIG. 1.

As best illustrated in FIG. 2, blade control system 24 may include control system components for monitoring, recording, storing, indexing, processing, and/or communicating the location of an aspect of machine 10, including blade 16, by automatically controlling blade 16 position in response to control input such as a blade positioning signal. The blade control system 24 may include, for example, control module 26 which may include a non-transitory computer memory, one or more data storage devices, a central processing unit, or any other components that may be used to control machine 10. Furthermore, although aspects of the present disclosure may be described generally as being stored in non-transitory memory, one skilled in the art will appreciate that these aspects can be stored on or read from different types of computer program products or computer-readable media such as computer chips and secondary storage devices, including hard disks, floppy disks, optical media, CD ROM, or other forms of RAM or ROM. Various other known circuits may be associated with control module 26, including power supply circuitry, signal-conditioning circuitry, solenoid driver circuitry, communication circuitry, and other appropriate circuitry.

Blade control system 24 may further include an input device 28 used to receive machine 10 control instructions from an on-board or off-board operator. Control instructions may include a blade positioning signal to control the movements and/or position of blade 16. Blade control system 24 may further include track speed sensor 30, configured to detect the track speed of machine 10. Blade control system 24 may further include actuator sensor 32, used to detect the position of actuator 18 while in operation, and locating device 34, which may be used in part to determine blade 16 position during operation by receiving a signal from one or more satellites 36. Other sensors (not shown) may be used to determine other operational factors, such as ground condition during machine 10 operation.

Locating device 34 may embody an electronic receiver configured to communicate with satellites 36 to determine a relative position with respect to system satellites 36. In particular, locating device 34 may receive and analyze high-frequency, low-power radio signals from multiple satellites 36 to triangulate a 3-D position relative to the different satellites. A signal indicative of this position may then be communicated from locating device 34 to control module 26 via a wired or wireless connection 40. Alternatively, locating device 34 may embody an INS (Inertial Navigation System), a component of a local tracking system, or any other known locating device that receives or determines positional information associated with machine 10.

Blade control system 24 may also include components configured for communicating with an off-board data system (not shown) through satellite, cellular, infrared and/or any other appropriate method for communication. It is further contemplated that blade control system 24 may be located on-board machine 10 or be remotely located off-board machine 10, and operatively connected to machine 10 via a wireless connection.

Control module 26 may be configured to receive inputs from input device 28, sensors 30, 32, locating device 34, and other components of machine 10, condition and/or modify a blade positioning signal, and deliver the modified blade positioning signal to one or more actuators 18. For example, control module 26 may receive various sensor inputs and one or more blade positioning signals, analyze the respective signals and inputs, and apply one or more digital filters to the blade positioning signals. Control module 26 may then transmit the modified blade positioning signal to one or more actuators 18. If the track speed and/or grouser impact frequency does not adversely affect the blade positioning signal, control module 26 may be further configured to transmit an unenhanced blade positioning signal to blade actuator 18.

Input device 28 is exemplified in FIG. 1 as an on-board control interface, usable by an on-board machine 10 operator. According to other exemplary embodiments, input device 28 is a wireless receiver in communication with an off-board control system.

Figure 3:
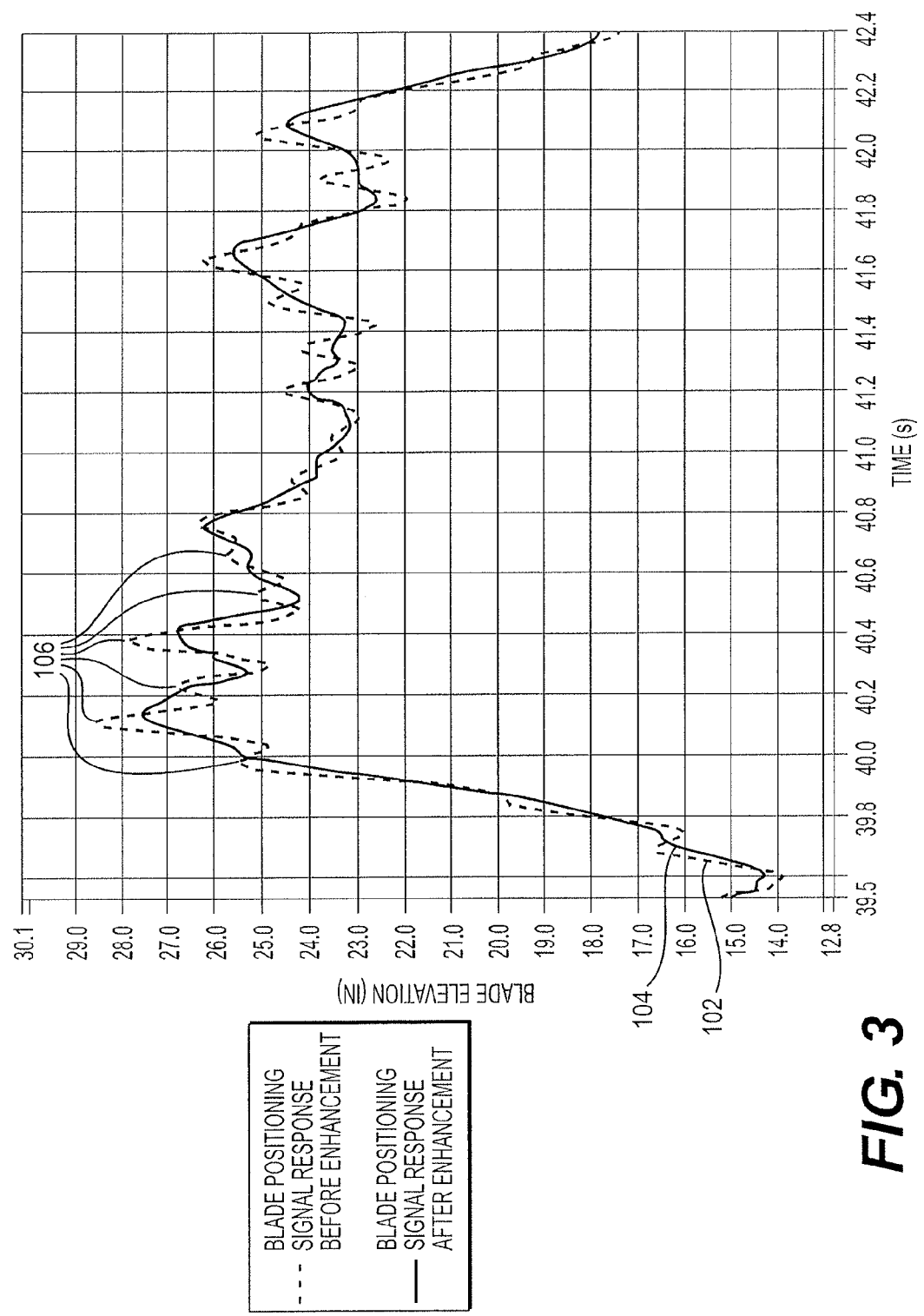
FIG. 3 is a diagrammatic illustration of an exemplary signal before and after being processed with the blade control system of FIG. 2.
Figure 4:
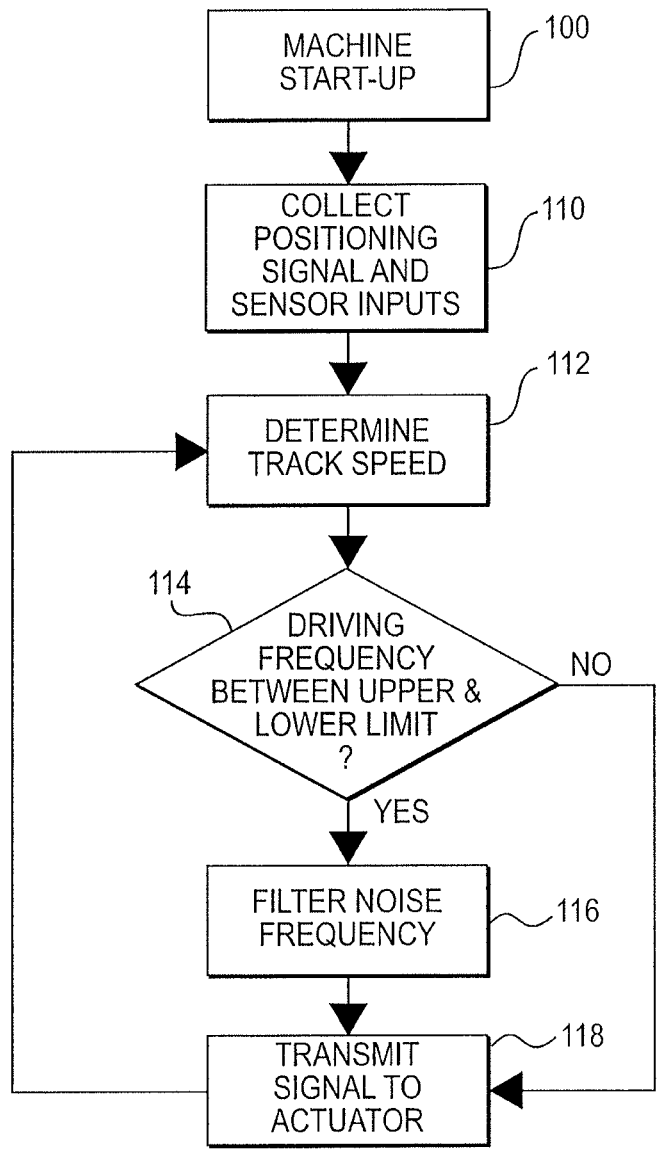
FIG. 4 is a flow chart illustrating an exemplary disclosed method of operating the blade control system of FIG. 2.

FIGS. 3 and 4 illustrate an exemplary method of controlling machine 12. FIGS. 3 and 4 will be discussed in the following section to further illustrate the disclosed blade control system 24 and its operation.

INDUSTRIAL APPLICABILITY

The disclosed blade control system 24 may be applicable to machines performing material moving operations where efficiency and accuracy is important in producing a graded surface. In particular, the disclosed blade control system 24 may reduce or eliminate the control signal artifacts in a blade positioning signal that are caused by grouser impacts to the work surface in order to mitigate unwanted movement in the machine blade. The operation of blade control system 24 will now be described.

As machine 10 travels across the ground surface in operation, control module 26 may automatically collect data from track speed sensor 30 while receiving a blade positioning signal from input device 28. For example, as machine 10 travels at low speed across densely packed soil, the track grousers engage the ground. As each track grouser 22 engages the ground, the engagement may cause machine 10 to be periodically lifted up by the height of grouser 22. As the track and grouser continue to move across the surface, machine 10 drops to the ground from the lifted position caused by grouser 22 engagement with the surface of the ground. The resulting vibration from the impact may cause a positive feedback cycle in the blade positioning signal, which may manifest as periodic signal noise in the blade positioning signal. Consequently, unwanted periodic movement in the blade 16 may occur.

During forward movement of machine 10 in operation, the proximate location for grouser 22 to first contact with the ground is beneath front idler 14. At some lower operational speeds, it has been observed that an unwanted artifact appears as a component in the blade positioning signal, as previously explained. In exemplary embodiments, the periodic component appears in the blade positioning signal each time that grouser 22 proximate to front idler 14 engages the ground. As the track speed increases or decreases, so does the frequency of grouser engagements, and therefore the frequency of the periodic signal component. It will be understood that reference to the grouser frequency, may also be indicative of track and/or grouser speed. For example, some lower machine speeds (the velocity in which the machine moves across the work surface) cause grousers 22 to periodically impact the ground with a frequency that linearly corresponds to machine 10 speed, because the distance between grousers on the machine 10 track are evenly spaced on the track. Therefore, machine and/or track speed directly corresponds to the relative frequencies of the unwanted signal components (the one or more signal artifacts). In this sense, grouser frequency may be directly related to track and/or grouser speed.

Referring briefly to FIG. 3, an illustration of an exemplary blade positioning signal is provided, illustrating the blade positioning signal 102 directed to actuator 18 before enhancement by blade control system 24 (shown as a dashed line), and the same signal 104 after enhancement (shown as a solid line). The difference in elevation for the "after" signal is due to natural elevation changes in the work surface. However, as previously discussed, a periodic, speed-variable signal component is produced by the grouser impacts during operational movement of machine 10. The periodic signal peaks 106 shown in the blade positioning signal before enhancement 102 correspond to the periodic grouser 22 impacts during machine 10 operation. Each peak 106 represents one grouser impact. The frequency of the grouser impacts (the distance between signal peaks 106 with respect to time) may vary with time according to machine 10 track-speed. That is, as the track-speed increases, the frequency of the positioning signal component also increases, which would create a periodic signal component 106 with a higher frequency. An exemplary speed-variable signal component 106 is described in FIG. 3 for illustrative purposes only. The signal response may vary greatly from that described in FIG. 3.

Further observation has shown that the speed-variable component 106 is greatest at grouser impact frequencies of 4-7 Hz. Machine speeds producing grouser impact frequencies greater than 4-7 Hz may not benefit from blade positioning signal enhancement by the control system 24. Similarly, at machine speeds producing grouser-impact frequencies less than about 4 Hz, blade 16 height differential caused by lifting by grouser 22 and dropping machine 10 may be minimal, and may benefit less from signal enhancement by blade control system 24.

Ground surface condition or other factors may also affect whether speed-variable component 106 is present in the blade positioning signal during machine 10 operation. For example, soft soil conditions that allow grouser 22 to easily penetrate the surface without lifting machine 10 at each grouser pass may not produce a noticeable speed-variable signal component, even when the sensed grouser frequency is within the operational range of 4-7 Hz. Similarly, very hard surfaces may adversely affect blade control system 24 in that grouser impacts have an increased adverse affect on the blade positioning signal, even at frequencies outside of the operational range of 4-7 Hz.

As illustrated in the flow chart of FIG. 4, after machine start-up (step 100), machine 10 begins operational movement on the work surface. A blade positioning signal is sent from input device 28 and received at control module 26. Control module 26 is in communication with track speed sensor 30, actuator sensor 32 and locating device 34, and automatically collects positioning signal information and sensor inputs (step 110), indicating the speed (and/or frequency) of grouser 22 movement, and the current position of blade 16. Control module 26 then uses sensor inputs to determine the track speed (step 112), which may be used in isolating and removing the unwanted speed-variable signal component 106 from the blade positioning signal.

Control module 26 next determines whether blade control system 24 should activate the blade positioning signal enhancement algorithm (step 114). Blade control system 24 makes the determination based on discovering the driving frequency of grouser 22 impacts using information collected from track speed sensor 30. When the driving frequency of grouser 22 impact is greater than or equal to a desired lower limit, for example, 4 Hz, blade control system 24 may activate the blade positioning signal enhancement algorithm. While the driving frequency of grouser 22 impacts is equal to or greater than the desired lower limit, and less than or equal to a desired upper limit, for example, 7 Hz, blade control system 24 may remove the speed-variable signal component 106 with a speed-variable digital notch filter, (step 106). The band of frequencies removed from the blade positioning signal may change with respect to time and grouser 22 frequency. When the speed-variable signal component 106 is greater than the upper limit or less than the lower limit, then blade control system 24 may pass the original (unenhanced) blade positioning signal to actuator 18 (step 118). If the driving frequency is between the upper and lower limit (the specified range), the blade positioning signal is then transmitted to actuator 18 (step 118) after filtering the speed-variable signal component 106.

In accordance with some embodiments, blade control system 24 is configured to activate the signal enhancement algorithm at other specified ranges of natural frequencies. There are many factors that may determine the appropriate specified range. For example, machine type, machine geometry, ground conditions, and other factors may be used to determine the appropriate specified range at which the signal enhancement algorithm is to be activated. As an example, blade control system 24 may be configured to remove one or more speed-variable signal components when the specified grouser impact frequency is greater than or equal to about 2 Hz and less than or equal to about 7 Hz.

According to some exemplary embodiments, blade control system 24 may be configured to remove one or more speed-variable signal components when the specified grouser impact frequency is greater than or equal to about 2 Hz and less than or equal to about 10 Hz.

According to yet other exemplary embodiments, the specified range at which blade control system 24 removes one or more speed-variable signal components when the specified grouser impact frequency is greater than or equal to 4 Hz and less than or equal to 10 Hz.

The driving frequency of the speed-variable signal component 106 may be determined in a number of ways. For example, the frequency may be calculated by blade control system 24, by dividing the current track speed, as detected by track speed sensor 30, by the distance between grousers (grouser pitch). Alternatively, a frequency may be calculated as some other function of machine speed, or by using other known methods.

Other ranges of machine speed may positively utilize signal enhancement, depending on machine type, machine configuration and machine geometry. As discussed previously, the grouser shape and the distance between grousers may affect the speed-variable signal component 106. Additionally, it has been observed that the length of lever arm 20 connecting blade 16 to machine 10, may differ according to machine geometry or type, and may have an impact on the appearance of speed-variable signal component 106 in the blade positioning signal. It has been observed that as lever arm 20 increases in length according to machine geometry or type, speed-variable signal component 106 may be diminished due to increased positional forgiveness (or "slop") naturally occurring as a result of the lengthened lever arm.

In addition to lever arm length, the distance between front idler 14 and front roller 15 has been observed to affect the speed-variable signal component 106. For example, at certain distances between front idler 14 and front roller 15, a secondary speed-variable signal component (hereafter "secondary component") may be introduced into the blade positioning signal. This secondary component is caused by grouser impacts proximate to front roller 15, in a similar way as the previously discussed positioning signal component caused by grouser impacts proximate to the front idler 14. The secondary component may also be filtered using a secondary notch filter.

Accordingly, blade control system 24 may determine the presence of a secondary component, and configure a second notch filter for application to the blade positioning signal using a similar method. When blade control system 24 determines the presence of a secondary speed-variable signal component in the blade positioning signal, control system 24 may first determine the frequency of the secondary speed-variable signal component. Secondly, the control system 24 may compare the frequency of the secondary signal component to the frequency of the initial speed-variable signal component. When the secondary frequency is within a specified range of the first frequency (hereafter "second specified range"), for example, within 1 Hz, control system 24 may activate the secondary notch filter. The secondary notch filter may continue to filter the blade positioning signal for the secondary frequency component until such time as the secondary speed-variable signal component is no longer within the second specified range, or the secondary component no longer present in the signal. The secondary filter may be turned off by control system 24 when the secondary component is not within the second specified range, or when the secondary component is no longer present.

Several advantages are realized with blade control system 24. For example, machine speed-variable signal noise in a blade conditioning signal may be reduced or eliminated in machine operation. As a result, an increase in efficiency and quality may be realized in achieving a smooth graded surface profile at lower operational speeds using the presently disclosed blade control system 24.

The flow chart depicted in FIG. 4 shows one possible order in which blade control system 24 described herein is operated. Those skilled in the art will appreciate that a different logical order may be utilized in the practice of the presently disclosed blade control system 24, if desired. It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A blade control system for a track-type machine comprising:
    a blade;
    an input device configured to control movement of the blade;
    an actuator in connection with the blade;
    a first sensor configured to determine a track-speed of the machine, wherein the track-speed is determined by a frequency of grouser impacts on a work surface; and
    a control module in communication with the input device, the actuator, and the first sensor, the control module configured to:
    receive a blade positioning signal from the input device;
    remove a component of the blade positioning signal based on the track-speed of the machine; and
    transmit a modified blade positioning signal to the actuator.

2. The blade control system of claim 1, wherein the control module is further configured to:
    collect information from the first sensor;
    determine a driving frequency of a speed-variable component of the positioning signal based on the information collected from the first sensor;
    determine if the driving frequency is within a specified range;
    remove the speed-variable component from the blade positioning signal if the driving frequency is within the specified range; and
    transmit to the actuator one of the positioning signal or a modified positioning signal.

3. The blade control system of claim 2, further configured to:
    determine a driving frequency of a secondary speed-variable component of the blade positioning signal based on the information collected from the first sensor;
    determine if the driving frequency of the secondary speed-variable component is within a second specified range; and
    remove the secondary speed-variable component from the blade positioning signal if the driving frequency of the secondary speed-variable component is within the second specified range.

4. The blade control system of claim 3, wherein the speed-variable component of the blade positioning signal is variable based on the track-speed of the machine.

5. The blade control system of claim 3, wherein the secondary speed-variable component of the blade positioning signal is variable based on the track-speed of the machine.

6. The blade control system of claim 3, wherein the control module further includes
a digital notch filter configured to remove the speed-variable component of the positioning signal based on the information collected from the first sensor.

7. The blade control system of claim 3, wherein the control module further includes a secondary notch filter configured to remove the secondary speed-variable component of the positioning signal.

8. The blade control system of claim 3, wherein the specified range is equal to or greater than about 4 Hz and less than or equal to about 7 Hz.

9. The blade control system of claim 3, wherein the specified range is equal to or greater than about 4 Hz and less than or equal to about 10 Hz.

10. The blade control system of claim 3, wherein the specified range equal to or greater than about 4 Hz and less than or equal to 10 Hz.

11. A computer-implemented method of controlling a blade in a track-type machine comprising:
    receiving, at a control module, a blade positioning signal from an input device;
    removing, via one or more processors, a component of the blade positioning signal based on a track-speed of the machine, wherein the track-speed is determined by a frequency of grouser impacts on a work surface; and
    transmitting, via one or more processors, a modified blade positioning signal to an actuator in connection with the control module.

12. The method of claim 11, wherein removing a component of the blade positioning signal further includes:
    collecting track-speed information from a first sensor;
    determining, via one or more processors, a driving frequency of a speed-variable component of the blade positioning signal based on the track-speed information collected from the first sensor, wherein the track-speed is determined by a frequency of grouser impacts;
    removing, via one or more processors, the speed-variable component from the blade positioning signal if the driving frequency is within the specified range; and
    transmitting to the actuator one of the positioning signal or a modified positioning signal.

13. The method of claim 12, further including:
    determining, with the control module, a driving frequency of a secondary speed variable component of the blade positioning signal based on the information collected from the first sensor;
    determining, with the control module, if the driving frequency of the secondary speed-variable component is within a second specified range; and
    removing the secondary speed-variable component from the blade positioning signal if the driving frequency of the secondary speed-variable component is within the second specified range.

14. The method of claim 12, wherein the speed-variable component of the blade positioning signal is variable based on the track-speed of the machine.

15. The method of claim 12, wherein the secondary speed-variable component of the blade positioning signal is variable based on the track-speed of the machine.

16. The method of claim 12, wherein the speed-variable component is removed from the positioning signal using a digital notch filter configured by the control module to remove the speed-variable component.

17. The method of claim 12, wherein the secondary speed-variable component is removed from the positioning signal using a secondary digital notch filter configured by the control module to remove the secondary speed-variable component.

18. The method of claim 12, wherein the speed-variable component is removed when the speed-variable component frequency is equal to or greater than about 4 Hz.

19. The blade control system of claim 18, wherein the speed-variable component is removed when the speed-variable component frequency is less than or equal to about 7 Hz.

20. A control system for a track-type work-machine blade, comprising:
- an input device configured to control movement of the blade;
- an actuator in connection with the blade;
- a first sensor configured to determine a track speed of the machine, wherein the track-speed is determined by a frequency of grouser impacts on a work surface; and
- a control module in communication with the input device, the actuator, and the first sensor, the control module configured to:
- receive a blade positioning signal from the input device;
- collect, via one or more processors, information from the first sensor;
- determine, via one or more processors, if a driving frequency of a speed variable component of the positioning signal is within a specified range, based on the information collected from the first sensor;
- determine, via one or more processors, if a secondary speed-variable component present in the blade positioning signal is within a second specified range, based on the information collected from the first sensor;
- remove at least one of the speed-variable component and the secondary speed variable component from the blade positioning signal if the driving frequency of the speed-variable component is within the specified range, or the secondary speed-variable component is within the second specified range; and
- transmit to the actuator one of the positioning signal or a modified positioning signal.

* * * * *